Patented Sept. 4, 1951

2,566,347

UNITED STATES PATENT OFFICE 2,566,347

SILICON ACYLATES

Charles A. MacKenzie, East Orange, N. J., assignor, by direct and mesne assignments, of one-half to Montclair Research Corporation, a corporation of New Jersey, and one-half to Ellis-Foster Company, a corporation of New Jersey No Drawing. Application April 17, 1946,
Serial No. 662,913

16 Claims. (Cl. 260—448.8)

This invention relates to silicon acylates and their preparation.

Among the objects of the present invention is the production of silicon acylates, particularly the tetraacylates but other acylated derivatives are included.

Further objects include novel methods for the preparation of such acylates.

Still further objects include silicon acylates prepared for the first time in the art and their utilization in various ways in compositions, etc.

Still further objects and advantages of the present invention will appear from the more detailed description set forth below, it being understood that this more detailed description is given by way of illustration and explanation only, and not by way of limitation since various changes therein may be made by those skilled in the art without departing from the scope and spirit of the present invention.

In accordance with the present invention, silicon acylates of carboxylic acids are prepared from a silicon halide and an organic carboxylic acid of more than two carbon atoms under controlled conditions enabling the character of the compound produced to be determined.

The silicon halide employed includes a variety of such materials such as silicon tetrachloride, silicochloroform, chlorsilanes such as hexachlorosilane, and organo silicon halides, including aliphatic silicon halides such as alkyl silicon halides represented by methyl silicon trichloride for example, carbocyclic silicon halides such as the aryl silicon halides, and alicyclic silicon halides where the alicyclic group is present such as cyclohexyl. The silicon halide may be a chloride or a bromide. The silicon iodides my be used with salts of carboxylic acids.

The acylates are produced from carboxylic acids which may be used in the form of the acids per se, the salts of such acids, as for example, the alkali metal salts, the anhydrides of the acids, as well as substituted acids where there is no substituent group in the acid which reacts with the silicon halide under the conditions employed. The acids may be monocarboxylic or polycarboxylic, but monocarboxylic acids are preferred. Thus aliphatic monocarboxylic acids, such as the fatty acids, represented by acetic, propionic, 2-ethylhexanoic, stearic acids may be employed including their substituted acids such as chloracetic; aromatic acids such as benzoic acid; etc.

The above mentioned reactants may be caused to react directly, either at ordinary or room temperatures or at elevated temperatures as by heating the reacting mixtures or carrying out the reaction under refluxing conditions. In most cases at least the reaction appears to proceed at very nearly the same rate when carried out at room temperature, as when heat is applied. The heat may serve no other purpose than to sweep out the hydrogen chloride or other analogous material from the reaction zone. An inert gas such as nitrogen may be utilized for this purpose also, either at room temperature reactions or in carrying out the reactions at elevated temperatures.

While the reactants may be made to react directly in the absence of any added materials, for control of the reaction and the nature of the products obtained, organic solvent liquids are desirably employed. Such solvent should at least be a solvent for one of the reactants employed. But more particularly in controlling the reaction and the nature of the product obtained, the organic liquid may be chosen from the standpoint of the solubility of the acylate product obtained in such liquid. On this basis two types of solvents may be distinguished: first, such solvents in which the initial reagents are soluble but the final product, namely, the silicon acylate sought is not soluble in the chosen solvent; and second, a solvent in which the initial reagents and the final product are soluble. Organic liquid solvents of the first type include for example, pentane, ethyl bromide, and isopropyl ether as representative of such solvents in which the acylate reaction product is insoluble. Solvents of the second type in which the acylate product is soluble include benzene and carbon tetrachloride as exemplary of this class of solvents. However, in this connection pentane should also be mentioned. The solubility of the acylate obtained in pentane varies with the molecular weight of the acylate produced. As the molecular weight increases, the acylate becomes more soluble in pentane. For example, in the case of the acylate of 2-ethylhexanoic acid, the product is quite soluble in pentane. Hence the choice of solvent is governed to some extent at least by the solubility of the particular acylate being prepared, with the silicon tetraacetate, pentane exhibits little solubility, and the tetraacetate precipitates as it is formed in a fairly high degree of purity as a monomeric material primarily. Regardless of the solvent used, the isolation of the product is readily carried out and a good yield is obtained.

It is interesting to note that when silicochloroform is utilized as a reactant, the major product obtained is the tetraacylate. Possibly this is due to the fact that hydroxylic compounds, like carboxylic acids, tend to replace the hydrogen of silicochloroform. Some triacylate may form in the reaction but as indicated, the major product obtained is the tetraacylate.

While proportions of the reactants may vary, for best results it is preferred to utilize a ratio of from 3 to 8 moles of carboxylic acid or related compound to 1 mole of the silicon halide such as silicon tetrachloride. The amount of solvent employed when the reaction is carried out in the presence of such solvent, may vary substantially but where it is desired to precipitate the product as formed utilizing a solvent in which the prepared acylate is insoluble, sufficient solvent should be present to precipitate the acylate.

The monomeric tetraacylates may be generally represented by the formula

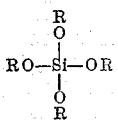

where R is an acyl group as set forth above.

In the case of polymeric acylates, they may be looked upon as made up of the repeating unit

where R is an acyl radical as set forth above, and in the case for example, of the polymeric acetate, the trimer may be represented by the formula

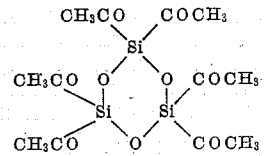

in which the unit of the second formula above is repeated three times; while in the tetramer the unit would be repeated four times. In some instances at least mixtures of polymers are obtained. While cyclic polymers are apparently the major product, linear polymers are not excluded which in the case of the acetate may be represented by the following formula

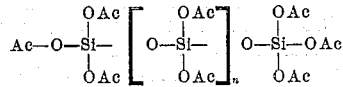

in which formulation Ac is the acetyl group and $n$ is any integer.

The reaction which takes place between the stated reactants may proceed in various ways involving the formation of an acyl chloride together with polymeric acylate as represented in the following equation $9CH_3COOH + 3SiCl_4 \rightarrow$ Si acetate trimer
(above) $+ 3CH_3COCl$ or the acyl chloride such as acetyl chloride may be formed when the ring closes in accordance with the following

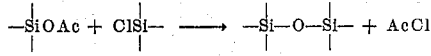

where Ac represents the acetyl group. Since acetic anhydride is produced in the formation of the silicon acetates, the polymeric material may be formed by splitting out of acetic anhydride as follows

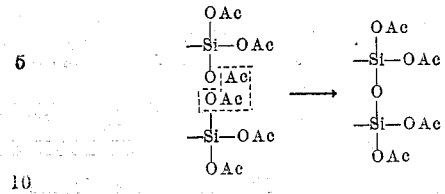

The resulting acylates may be formed as a result of one or the other of these reactions, or by a combination of them, or one reaction may take place in exclusion to the other, but whatever the mechanism may be, no theoretical considerations are to be taken as limiting with respect to the present disclosure.

Instead of treating the silicon halide such as silicon tetrachloride directly with the acylating agent such as acetic acid, the silicon halide may first be treated with a reactant such as ethyl alcohol, using for example 2 moles of ethanol to 1 of silicon tetrachloride, followed by reaction with the acylating agent such as acetic acid, on the unreacted chlorines in the reaction product obtained from the first step. By proceeding in this way, it is possible to produce a product lower in the acyl group such as acetic acid content than where the reactants are employed directly in the proportions as given above. Or if desired, the acylate first prepared from for example, silicon tetrachloride and the acylating agent such as acetic acid may after its preparation be treated with an agent to replace the acyl group either in whole or in part, such as an alcohol specifically ethyl alcohol.

The acylates produced in accordance with the present invention have a variety of uses based on both expected and unexpected properties of such compounds. Considering the tetraacylate for example, if water is added slowly to the above product, considerable heat is evolved and hydrated silica deposits. The other product formed is acetic acid. However, if water is added rapidly to the product with shaking, or if the product is added to a large volume of stirred water, (approximately 5 volumes or more of water to 1 volume of the silicon acetate) an entirely different result is obtained. Although heat is generated no precipitation occurs. The anhydride is decomposed but the silica remains colloidally dispersed or dissolved. The colloidal solution results from a combination of at least two factors: first, the silicon acetate is rapidly decomposed by water; and second, the acetic acid formed acts as a peptizing agent and prevents the deposition of hydrated silica. However, the hydrated silica may be obtained from the aqueous solution in a number of ways. For example, it may be precipitated by the removal by distillation or evaporation of the acetic acid and part of the water. A rapid precipitation may be obtained by raising the pH of the solution to slightly above 7 with ammonium hydroxide.

This illustrates the production of colloidal silica solutions. The silica sol so formed is similar to the usual silica sol in some ways but contains no inorganic ions such as are present in silica sols produced from alkali silicates. The exact result obtained depends, however, in part on the type of acylate employed as well as on the manner in which it is handled. It has been found for example, that the lower acylates, as for example, the acetate and propionate work in the manner described above. The higher acylates such as that from 2-ethylhexanoic acid behave differently. Silica sols do not appear to form. This may be due to the fact that the larger groups may protect the compound from hydrolysis or that hydrolysis occurs but the insoluble fatty acid carries the silica with it when it separates. It is interesting to note, however, that ammonium hydroxide solution will precipitate silica even in the case of such acylates as that produced from 2-ethylhexanoic acid.

The methods referred to above are convenient for applying hydrated silica from water solutions. The solution may be used as it is made or most of the acetic acid may be neutralized so that an essentially neutral solution is obtained. The product may be applied to various types of materials such as cloth by a simple dipping operation, whereupon drying the cloth then leaves it weighted with hydrated silica. Paper may be similarly treated as well as ceramic surfaces and in fact any article may be treated where the deposition of hydrated silica is desirable. Or the hydrated silica obtained may be utilized in the preparation of catalysts for various purposes. The acylates of the present invention may also be employed in the production of other types of silicon derivatives by appropriate reactions.

The first example describes the preparation of silicon tetraacetate using pentane as a solvent.

*Example 1.*—In a 200 ml. flask, attached to a reflux condenser with a calcium chloride tube at the top, was placed a mixture of 10.6 grams SiCl$_4$, 17.0 grams of acetic acid and 20 ml. of pentane (or ethyl bromide or isopropyl ether). The mixture was heated at 60–70° C. for five hours. Hydrogen chloride was evolved continuously and a precipitate of silicon tetraacetate appeared after about one-half hour. After cooling the flask, the pentane (or ethyl bromide or isopropyl ether) was decanted and the solid product washed several times with fresh pentane and finally dried in a moisture-free atmosphere at about 60° C. The product obtained is quite pure and melts at 109–110° C. Yield 82%. It may be recrystallized in benzene or carbon tetrachloride although the solubility in these two solvents is quite high.

Analytical data:
 Equivalent weight—calc., 66.0; found, 66.3.
 Percent silicon—calc. 10.6%; found, 10.6%.
 Mol. weight (benzene)—calc., 264; found, 267.

If the silicon tetracetate is poured slowly into rapidly stirred cold water the compound hydrolyzes but the silica remains in solution as a silica sol or colloidal silica. If the resulting solution is made basic with ammonium hydroxide, hydrated silica is precipitated. The precipitation of silica occurs gradually after several minutes and is complete after five minutes.

When silicon tetraacetate is heated at 180–200° C. for several hours acetic anhydride is removed and a viscous liquid remains. Colloidal silica solutions can be made from this product by pouring it into stirred cold water.

In the next example silicon tetraacetate is prepared from potassium acetate and silicon tetrachloride.

*Example 2.*—In a 500 ml. three-neck flask equipped with a reflux condenser and a stirrer was placed a mixture of 21.3 grams SiCl$_4$, 49 grams of potassium acetate and 100 ml. of benzene. The mixture was heated to gentle refluxing for three hours. The flask was then cooled and the contents filtered through fine glass wool. The benzene solution of the silicon tetraacetate was distilled under reduced pressure with the aid of a water pump. After removal of the benzene there remained 19 grams (60% yield of silicon tetraacetate) of a white crystalline product. It was washed several times with pentane and then dried. M. P. 108–110° C.

The next example describes the preparation of silicon tetraacetate from silicochloroform using pentane as a solvent.

*Example 3.*—In a 200 ml. flask, attached to a reflux condenser with a calcium chloride tube at the top, was placed a mixture of 8.4 grams SiHCl$_3$, 11.3 grams acetic acid (mole ratio SiHCl$_3$:CH$_3$COOH:1:3) and 20 ml. of pentane. The mixture was heated at 60–70° C. for five hours. Hydrogen chloride was evolved continuously and a white, crystalline material separated from the solution. After cooling the flask the product was washed several times with pentane and then dried, in the absence of moisture, at about 60° C. The product melted at 105–110° C. After one recrystallization from benzene the melting point was 108–110° C. No melting point depression was obtained when a mixed melting point of the product with silicon tetraacetate was determined. Yield of silicon tetraacetate based on acetic acid used was 75%.

Analytical results confirmed the structure of the compound as the tetraacetate.

Neutral equiv., 66.4—calc. for silicon tetraacetate, 66.0.

Silicon, per cent, 10.6—calc. for silicon tetraacetate, 10.6.

The next example illustrates the use of solvents in which silicon tetraacetate is soluble.

*Example 4.*—In a 200 ml. flask, attached to a reflux condenser, was placed a mixture of 10.6 grams SiCl$_4$, 17.0 grams of acetic acid and 25 ml. of benzene (or carbon tetrachloride). The mixture was heated 60–80° C. for about five hours. Hydrogen chloride was evolved continuously. No precipitation occurred since the silicon tetraacetate formed remained dissolved in the solvent. The benzene (or carbon tetrachloride) was removed by distillation until a viscous liquid remained. On cooling, the viscous liquid changed to an almost solid mass of white crystals. The crystals were washed with pentane and dried. Analysis showed the product to be silicon tetraacetate.

The next example describes the preparation of silicon tetrapropionate.

*Example 5.*—In a 200 ml. flask, attached to a reflux condenser with a calcium chloride tube at the top, was placed a mixture of 10.6 grams of SiCl$_4$, 18.5 grams of propionic acid and 20 ml. of pentane. The mixture was heated at 70–90° C. for four hours. After cooling the flask, the pentane was decanted and the white crystalline product was washed several times with fresh pentane. The product was then dried, in the absence of moisture, at about 60° C. The product had a melting point of 55.0–56.0° C. Yield 80%.

Neutral equivalent—calc., 80.0; found, 80.1.
Per cent silicon—calc., 8.8; found, 8.6.

The next example describes the preparation of silicon tetrapropionate from silicochloroform.

*Example 6.*—In a 200 ml. flask, attached to reflux condenser, was placed a mixture of 8.4 grams of silicochloroform, 13.9 grams of propionic acid and 20 ml. of pentane. The mixture was heated at 70–90° C. for 4 hours. After cooling the flask the pentane was decanted and the white crystalline product was washed several times with fresh pentane and then dried. The determination of physical constants showed the product to be silicon tetrapropionate.

The next example describes the preparation of silicon tetraacylate of 2-ethylhexanoic acid.

*Example 7.*—In a 200 ml. flask, attached to a condenser, was placed a mixture of 10.6 grams of $SiCl_4$, 36 grams of 2-ethylhexanoic acid and 20 ml. of pentane. The mixture was heated at about 70° C. for four hours. Fifteen ml. more of pentane was added and the mixture was heated for 5 hours at 80–85° C. The evolution of hydrogen chloride had practically ceased at this point. The contents of the flask were cooled. The product formed remained dissolved in the pentane. The pentane was removed by placing the flask under reduced pressure with the aid of a water pump. The product was finally freed of any volatile impurities by heating for 45 minutes at 200° C. and 4 mm. pressure. The residue was a moderately viscous liquid which could not be made to crystallize.

Analysis for silicon—calc., 4.6%; found, 4.8%.
Neutral equivalent—calc., 151.0; found, 157.

The next example described the preparation of a product from silicon tetrachloride and technical stearic acid.

*Example 8.*—Thirty-five grams (0.125 mole) of technical stearic acid, commercially known as "Hydrofol Acids 150," was dissolved in 250 ml. of anhydrous diisopropyl ether in a 500 ml. flask. Any water present was removed from the solution as the ether-water azeotrope and was collected in a Stark-Dean water trap. After 3 hours reflux on an oil bath at 110° C. there was collected 0.1 ml. of water.

The clear, light yellow solution was cooled to room temperature and 5.3 grams (0.031 mole) of $SiCl_4$ was added. A reflux condenser, with a calcium chloride at the top, was attached to the flask. The mixture was heated on an oil bath at 110° C. for 1.5 hours, then at 150° C. for 6 hours. At this point the evolution of hydrogen chloride appeared to cease so the reaction mixture was cooled. The isopropyl ether was removed under reduced pressure first at 20 mm. with a water pump, then at 3–5 mm. with an oil vacuum pump. There was obtained 36.5 g. of a silicon containing waxy solid.

The next example describes the preparation of silicon tetraacetate at room temperature.

*Example 9.*—In a 300 ml. 3-neck flask, equipped with a condenser, was placed a mixture of 10.6 grams of $SiCl_4$, 15 grams of acetic acid and 30 ml. of pentane. Dry nitrogen was bubbled through the mixture for about five hours. Hydrogen chloride was continuously evolved and silicon tetraacetate started to precipitate during the first hour of the reaction. When the hydrogen chloride ceased coming off the pentane was decanted from the product. The silicon tetraacetate was washed several times with pentane and then dried. M. P. 108–110° C. Yield 70% of theory.

In the next example the preparation of a polymeric silicon acetate is described.

*Example 10.*—A mixture of one mole of silicon tetrachloride and eight moles of acetic acid was placed in a 3-neck flask equipped with a stirrer and a reflux condenser. A calcium chloride tube was placed on the top of the condenser. An oil bath was placed around the mixture and the temperature of the bath was gradually raised over a two hour period to 160° C. The rate of the heating was governed by the extent of the hydrogen chloride evolution. The temperature was held at 160° C. for one-half hour. At this point the evolution of hydrogen chloride had nearly ceased. The excess acetic acid was removed by distillation. Acetyl chloride was isolated from this distillate. The residue was washed several times with pentane in which reagent it had low solubility. The excess pentane was removed by distillation under reduced pressure. The product remaining was a very viscous liquid which would not crystallize. At −15 to −20° C. the viscous liquid became a hard, clear solid. The temperature was lowered to −75° C. As the temperature decreased the glassy solid cracked in a conchoidal fracture form. On warming the solid became fluid again at about −20° C.

Analytical data:
  Neutral equivalent—calc. for
    $((CH_3COO)_{2n}SiO)_n = 81.0$; found, 82.0.
  Per cent Silicon—Calc. = 17.2; found, 15.8.
  Molecular weight (in benzene)—calc. for
    $((CH_3COO)_2SiO)_3 = 48.6$; found, 482; 492.

The molecular weight values found indicate that the silcon acetate present is mainly in the form of a trimer of $(CH_3COO)_2SiO$.

When water was added slowly to some of the above product considerable heat was evolved and hydrated silica deposited. The other product of the reaction was acetic acid. When the product was added slowly to rapidly stirred water no precipitation occurred and the silica formed remained in solution in a colloidal form. The hydrated silica was obtained from the solution in several ways. For example, concentration of the solution by distillation precipitated it. Addition of ammonium hydroxide to the solution until the pH of the solution was above seven gave a voluminous precipitation of hydrated silica.

The next example describes the preparation of a polymeric silicon acetate involving a lower ratio of acetic acid to silicon tetrachloride used than was the case in Example 10.

*Example 11.*—A mixture of one mole of silicon tetrachloride and three moles of acetic acid was placed in a 3-neck flask equipped with a stirrer and a reflux condenser. An oil bath was placed around the mixture and the temperature of the bath was gradually raised to 160° C. over a two hour period. The temperature was then maintained at 160° C. for one-half hour. The mixture was then cooled and the contents of the flask was transferred to a distilling flask. A small amount of distillate was obtained which contained acetic acid and acetyl chloride. The liquid residue was washed several times with pentane and the excess pentane was removed by distillation.

Neutral equivalent—calc. for the polymeric unit $(CH_3COO)_2SiO = 81$; found, 78.

The next example describes the preparation of a polymeric silicon propionate.

*Example 12.*—In a 200 ml. flask, attached to a reflux condenser with a calcium chloride tube at the top, was placed a mixture of 42.5 grams (0.25 mole) of $SiCl_4$ and 55.5 grams (0.75 mole) of propionic acid. An oil bath was placed around the flask and the temperature of the oil was gradually raised, over a one hour period, to 160° C. This temperature was then maintained for about six hours. The reaction mixture was cooled and then distilled under reduced pressure. The entire distillate, 23 grams, was propionic anhydride. There was no evidence of any propionyl chloride. The residue was washed several times with small portions of pentane and the residual pentane was removed by distillation under reduced pressure. The liquid residue at this point weighed 28 grams.

Neutral equivalent—calc. for
$((CH_3CH_2COO)_2Si)_n=95$; found, 91.
Per cent silicon—calc. 14.7; found, 15.5.

The next example describes a product made by the successive additions of acetic acid and ethyl alcohol to silicon tetrachloride.

*Example 13.*—Silicon tetrachloride (7.4 ml.) was placed in a 200 ml. round bottom flask. A calcium chloride tube was attached to the flask. To the SiCl₄ was added 7.1 ml. of acetic acid. The mixture was allowed to stand at room temperature for three hours. Ethyl alcohol (7.1 ml.) was then added in small portions while the mixture was shaken. The mixture then set another three hours at room temperature. It was finally heated for two hours at 60° C. The product so formed gave a clear solution when mixed with water. The addition of ammonium hydroxide to the water solution produced a voluminous precipitate of siliceous material.

The next example describes the preparation of silicon tetrabenzoate.

*Example 14.*—In a 3-neck flask, fitted with a stirrer, was placed a mixture of 18 grams sodium benzoate, 5.3 grams silicon tetrachloride and 50 ml. of benzene. The mixture was stirred at room temperature for 5 hours. The benzene layer was then removed from the solid by filtration. The filtrate was subjected to vacuum distillation until all the benzene had been removed. After the removal of the benzene there remained in the flask a white solid. This solid was found to be very sensitive to water, even atmospheric moisture readily decomposing it to hydrated silica and benzoic acid. The compound did not have a definite melting point, decomposition occurring over a wide range starting at approximately 130° C.

Silicon calc. for $Si(OCOC_6H_5)_4=5.5$.
Silicon found=5.4.

Having thus set forth my invention, I claim:

1. The method of making reaction products including silicon tetraacylate which comprises contacting at a temperature between room temperature and refluxing but below that of decomposition of the tetraacylate, silicochloroform with a compound selected from acids having the formula RCOOH where R is selected from the group consisting of alkyl and monocyclic aryl radicals, and salts of said acids in the presence of an organic liquid solvent for at least one of the reactants.

2. The method of making reaction products including silicon tetraacylate which comprises contacting at a temperature between room temperature and refluxing but below that of decomposition of the tetraacylate, silicochloroform with a compound selected from acids having the formula RCOOH where R is selected from the group consisting of alkyl and monocyclic aryl radicals, and salts of said acids.

3. The method of claim 1 in which the organic liquid solvent is one in which the acylate formed is insoluble.

4. The method of claim 2 in which the mole ratio of silicochloroform to compound selected is 1 to at least 3, the method being carried out in the absence of a solvent.

5. The method of claim 4 in which the acid is propionic acid.

6. The method of making reaction products including silicon tetraacylate which comprises contacting at a temperature between room temperature and refluxing but below that of decomposition of the tetraacylate silicochloroform with a fatty acid having more than two carbon atoms having the formula RCOOH where R is alkyl.

7. The method of making reaction products including silicon tetraacylate which comprises contacting at a temperature between room temperature and refluxing but below that of decomposition of the tetraacylate silicochloroform with an aromatic corboxylic acid having the formula RCOOH where R is monocyclic aryl.

8. The method of making reaction products including silicon tetraacylate which comprises contacting at a temperature between room temperature and refluxing but below that of decomposition of the tetraacylate silicochloroform with a fatty acid having more than two carbon atoms having the formula RCOOH where R is alkyl in the presence of an organic liquid solvent for at least one of the reactants.

9. The method of making reaction products including silicon tetraacylate which comprises contacting at a temperature between room temperature and refluxing but below that of decomposition of the tetraacylate silicochloroform with an aromatic carboxylic acid having the formula RCOOH where R is monocyclic aryl in the presence of an organic liquid solvent for at least one of the reactants.

10. A polymeric silicon propionate the polymer being selected from the group consisting of linear and cyclic polymers.

11. The method of making reaction products including silicon tetraacylate which comprises contacting at a temperature between room temperature and refluxing but below that of decomposition of the tetraacylate silicochloroform and a carboxylic acid having at least two carbon atoms in the presence of an organic liquid solvent in which the acylate formed is soluble.

12. A polymeric silicon acylate of a carboxylic acid of the formula RCOOH where R is selected from the group consisting of alkyl and monocyclic aryl radicals and having more than two carbon atoms the polymer being selected from the group consisting of linear and cyclic polymers.

13. A polymeric silicon acylate having the repeating unit

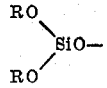

where R is a carboxylic acyl group of at least two carbon atoms the radical in the acyl group being selected from the group consisting of alkyl and monocyclic aryl radicals, the polymer being selected from the group consisting of linear and cyclic polymers, the end group in linear polymers being selected from the class consisting of OR and OH.

14. The method of making reaction products including silicon tetraacylate which comprises heating at temperatures of from 70 to 90° C. under refluxing conditions propionic acid and silicochloroform in mole ratios of at least 3:1 in the presence of a solvent for one of the reactants which is not a solvent for the acylate.

15. The method as set forth in claim 14 in which the solvent is pentane.

16. The method of making reaction products including silicon tetraacylate which comprises heating at temperatures of from 70 to 90° C. under refluxing conditions fatty acid and silicochloroform in mole ratios of at least 3:1 in the presence of a solvent for one of the reactants which is not a solvent for the acylate.

CHARLES A. MacKENZIE.

REFERENCES CITED

The following references are of record in the file of this patent:

UNITED STATES PATENTS

| Number | Name | Date |
|---|---|---|
| 1,918,338 | Kaufmann | July 18, 1933 |
| 2,017,000 | Hintermaier | Oct. 8, 1935 |
| 2,150,507 | Kropa | Mar. 14, 1939 |
| 2,253,128 | Longkammerer | Aug. 19, 1941 |
| 2,397,287 | Ostberg | Mar. 26, 1946 |
| 2,397,727 | Daudt | Apr. 2, 1946 |
| 2,405,988 | Barry | Aug. 20, 1946 |

OTHER REFERENCES

Taurke: Berichte, vol. 38, page 1670.

Friedel: Annalen, vol. 145 (1888), page 177.

Dilthey: Annalen, vol. 344, page 304.

Montanna: "Jour. Am. Chem. Soc.," vol. 49 (1927), pages 2114, 2115.

Rauter: "Annalen der Chemie," vol. 270, page 260.

Friedel et al.: "Annalen der Chemie," vol. 145 (1868), pages 174–176 and 178.

Schuyten et al.: "Jour. Am. Chem. Soc.," vol. 69 (1947), pages 2110–2112.